United States Patent
Kamat et al.

(10) Patent No.: US 12,261,809 B2
(45) Date of Patent: Mar. 25, 2025

(54) CONTEXT-AWARE CONVERSATIONAL ASSISTANT

(71) Applicant: HRB Innovations, Inc., Las Vegas, NV (US)

(72) Inventors: Vinayak Kamat, Overland Park, KS (US); Roman Breslav, Newton, MA (US)

(73) Assignee: HRB Innovations, Inc., Wilmington, DE (US)

( * ) Notice: Subject to any disclaimer, the term of this patent is extended or adjusted under 35 U.S.C. 154(b) by 0 days.

(21) Appl. No.: 15/581,177

(22) Filed: Apr. 28, 2017

(65) Prior Publication Data

US 2018/0316636 A1    Nov. 1, 2018

(51) Int. Cl.
*H04L 51/046* (2022.01)
*G06Q 30/016* (2023.01)
*H04L 51/02* (2022.01)
*H04L 51/216* (2022.01)

(52) U.S. Cl.
CPC ............ *H04L 51/046* (2013.01); *H04L 51/02* (2013.01); *H04L 51/216* (2022.05); *G06Q 30/016* (2013.01)

(58) Field of Classification Search
CPC ....... H04L 51/046; H04L 51/16; H04L 51/02; H04L 51/216; H04L 40/123; G06Q 30/016; G06F 40/174; G06F 16/9535; G06F 17/243; H04M 3/51; H04M 3/4933
USPC ....................................................... 715/752
See application file for complete search history.

(56) References Cited

U.S. PATENT DOCUMENTS

| | | | | |
|---|---|---|---|---|
| 5,956,024 A | * | 9/1999 | Strickland | G06Q 30/02 715/717 |
| 5,987,415 A | * | 11/1999 | Breese | H04N 21/466 704/275 |
| 6,177,932 B1 | * | 1/2001 | Galdes | G06F 16/954 715/733 |
| 6,690,788 B1 | * | 2/2004 | Bauer | H04M 3/5233 379/265.09 |
| 6,718,367 B1 | * | 4/2004 | Ayyadurai | H04L 51/12 370/260 |
| 6,718,368 B1 | * | 4/2004 | Ayyadurai | H04L 51/12 704/1 |

(Continued)

OTHER PUBLICATIONS

Moxley et al., Conversational Question and Answer, published on Feb. 27, 2013, Document ID CN 102947823 A, pp. 19 (Year: 2013).*

(Continued)

*Primary Examiner* — Chau T Nguyen
(74) *Attorney, Agent, or Firm* — Erise IP, P.A.

(57) ABSTRACT

Method and media for an interface for a context-aware conversational assistant. A hybrid system is disclosed that can take advantage of both a human agent's facility at interacting with the user and an automated system's speed and accuracy at information retrieval to quickly and accurately provide the user with the needed information. In response to a user query, the conversational assistant determines one or more responses that may be relevant and presents them in the chat window to the agent. If the conversational assistant correctly interpreted the question, the agent can quickly respond to the query using the pre-generated response. Otherwise, the agent can edit a pregenerated response or compose a new response from scratch.

20 Claims, 4 Drawing Sheets

(56) References Cited

U.S. PATENT DOCUMENTS

| | | | | |
|---|---|---|---|---|
| 8,935,274 B1* | 1/2015 | Mihailovici | G06F 16/31 | 707/766 |
| 8,996,639 B1* | 3/2015 | Faaborg | H04L 51/02 | 709/206 |
| 9,064,284 B1* | 6/2015 | Janiszeski | G06Q 40/00 | |
| 9,191,615 B1* | 11/2015 | Valimaki | H04N 7/147 | |
| 9,412,103 B1* | 8/2016 | d'Escragnolle | H04M 3/5232 | |
| 9,542,447 B1* | 1/2017 | Brennan | G06F 16/24522 | |
| 9,600,770 B1* | 3/2017 | Moffa | G06N 5/022 | |
| 9,715,496 B1* | 7/2017 | Sapoznik | G06F 17/2715 | |
| 9,723,149 B2* | 8/2017 | Meng | G06Q 30/02 | |
| 9,785,316 B1* | 10/2017 | Kosslyn | H04L 51/22 | |
| 10,447,853 B1* | 10/2019 | Ouimette | H04M 3/5133 | |
| 10,528,874 B2* | 1/2020 | Appel | G06N 5/022 | |
| 10,594,638 B2* | 3/2020 | Bostick | H04L 51/04 | |
| 10,698,706 B1* | 6/2020 | Rabe | G06F 9/453 | |
| 10,706,109 B2* | 7/2020 | Ansari | G06F 40/242 | |
| 10,783,583 B1* | 9/2020 | Gunn, Jr. | G06Q 40/06 | |
| 11,157,929 B1* | 10/2021 | Eby | H04L 67/52 | |
| 2001/0047270 A1* | 11/2001 | Gusick | G06Q 30/016 | 707/999.107 |
| 2001/0054064 A1* | 12/2001 | Kannan | H04M 7/0027 | 709/218 |
| 2002/0059378 A1* | 5/2002 | Mustafa | H04L 29/06 | 709/205 |
| 2002/0143898 A1* | 10/2002 | Mansfield | G06Q 30/02 | 709/204 |
| 2005/0132298 A1* | 6/2005 | Lueckhoff | G06Q 30/02 | 715/758 |
| 2005/0193055 A1* | 9/2005 | Angel | G06Q 30/02 | 709/204 |
| 2006/0064504 A1* | 3/2006 | Rechterman | G06Q 10/107 | 709/238 |
| 2007/0033116 A1* | 2/2007 | Murray | G06F 17/243 | 705/31 |
| 2007/0211881 A1* | 9/2007 | Parker-Stephen | H04M 3/5133 | 379/265.01 |
| 2008/0052377 A1* | 2/2008 | Light | G06Q 10/107 | 709/218 |
| 2008/0282204 A1* | 11/2008 | Del Valle Lopez | G06F 9/453 | 715/866 |
| 2009/0006550 A1* | 1/2009 | Singh | G06Q 30/02 | 709/204 |
| 2009/0076795 A1* | 3/2009 | Bangalore | G06F 40/30 | 704/9 |
| 2009/0292722 A1* | 11/2009 | Ayloo | G06Q 10/10 | |
| 2010/0088331 A1* | 4/2010 | White | G06F 16/24575 | 707/E17.014 |
| 2011/0235797 A1* | 9/2011 | Huet | G06Q 10/10 | 379/265.09 |
| 2012/0079087 A1* | 3/2012 | Mukherjee | G06Q 30/06 | 709/223 |
| 2012/0117070 A1* | 5/2012 | Hiltz-Laforge | G06F 16/335 | 707/740 |
| 2012/0323947 A1* | 12/2012 | Bice | G06F 16/24522 | 707/760 |
| 2013/0191520 A1* | 7/2013 | Khouri | H04L 41/18 | 709/223 |
| 2013/0203439 A1* | 8/2013 | Lifshitz | G06Q 50/01 | 455/456.2 |
| 2013/0262598 A1* | 10/2013 | Makanawala | H04L 51/32 | 709/206 |
| 2013/0346886 A1* | 12/2013 | Cauchois | H04L 51/046 | 715/758 |
| 2014/0032713 A1* | 1/2014 | Phan | H04L 67/16 | 709/217 |
| 2014/0074454 A1* | 3/2014 | Brown | G10L 15/08 | 704/235 |
| 2014/0214636 A1* | 7/2014 | Rajsky | G06Q 40/123 | 705/31 |
| 2015/0100581 A1* | 4/2015 | O'Donnell | H04L 67/10 | 707/737 |
| 2015/0112971 A1* | 4/2015 | Wolfram | G06F 16/951 | 707/722 |
| 2015/0161615 A1* | 6/2015 | Balasubramanian | H04L 12/1822 | 705/7.14 |
| 2015/0206063 A1* | 7/2015 | Santero | G06Q 30/016 | 706/12 |
| 2015/0227941 A1* | 8/2015 | Tuchman | G06Q 30/016 | 705/7.14 |
| 2015/0256675 A1* | 9/2015 | Sri | H04M 3/5183 | 379/265.09 |
| 2015/0347919 A1* | 12/2015 | Bastide | H04L 51/02 | 706/52 |
| 2016/0140230 A1* | 5/2016 | Villeneuve | G06F 16/951 | 707/706 |
| 2016/0142544 A1* | 5/2016 | Oh | G06Q 30/01 | 379/88.08 |
| 2016/0179759 A1* | 6/2016 | Ansari | G06F 16/93 | 715/249 |
| 2016/0198047 A1* | 7/2016 | McCormack | G06Q 30/016 | 379/265.09 |
| 2016/0239847 A1* | 8/2016 | Arvapally | G06Q 30/016 | |
| 2017/0032468 A1* | 2/2017 | Wang | G06Q 40/123 | |
| 2017/0069340 A1* | 3/2017 | Nowson | G06F 40/30 | |
| 2017/0091777 A1* | 3/2017 | Bender | H04L 67/535 | |
| 2017/0132638 A1* | 5/2017 | Chigusa | G06F 16/93 | |
| 2017/0223190 A1* | 8/2017 | Mandel | G06Q 30/016 | |
| 2017/0242886 A1* | 8/2017 | Jolley | G06F 40/211 | |
| 2017/0277667 A1* | 9/2017 | Weston | G06F 3/0484 | |
| 2017/0279906 A1* | 9/2017 | Laird-McConnell | H04L 51/02 | |
| 2017/0318012 A1* | 11/2017 | Kim | H04L 69/18 | |
| 2018/0012231 A1* | 1/2018 | Sapoznik | H04M 3/5141 | |
| 2018/0053100 A1* | 2/2018 | Appel | G06N 5/022 | |
| 2018/0139326 A1* | 5/2018 | Kalathur | H04M 3/5232 | |
| 2018/0225365 A1* | 8/2018 | Altaf | G06F 16/3344 | |
| 2018/0232742 A1* | 8/2018 | Zhao | G06Q 30/016 | |

OTHER PUBLICATIONS

Messenger Platform; facebook for developers; Date Printed: Jun. 8, 2017; Date Posted: Unknown; <https://developers.facebook.com/docs/messenger-platform>.

Bot Framework; Microsoft; Date Printed: Jun. 8, 2017; Date Posted: Unknown; Copyright 2017; <https://dev.botframework.com>.

\* cited by examiner

CONTEXT-AWARE CONVERSATIONAL ASSISTANT

RELATED APPLICATIONS

This non-provisional patent application shares certain common subject matter with earlier-filed U.S. patent application Ser. No. 15/450,657, filed Mar. 6, 2017 and entitled HYBRID CONVERSATIONAL CHAT BOT SYSTEM. The identified earlier-filed patent application is hereby incorporated by reference in its entirety into the present application.

BACKGROUND

1. Field

Embodiments of the invention generally relate to conversation systems and, more particularly, to conversation systems that enhance the productivity of a human agent with an automated system to allow the human agent to respond to user queries with increased speed and accuracy.

2. Related Art

Traditionally, conversation systems have take one of two forms: either a user is speaking to a human agent or to an automated system that attempts to provide answers to the user's queries without human intervention. However, each of these types of systems has their disadvantages. Human agents, while accurate at determining what information the user is asking for, are slow and sometimes inaccurate at retrieving the information itself. Automated system, by contrast, can quickly and accurately look up information in databases but are poor at parsing free-form queries from users to determine what information they are looking for because they lack the context of the conversation and the user's history.

As such, what is needed is a hybrid system that can take advantage of both a human agent's facility at interacting with the user and an automated system's speed and accuracy at information retrieval to provide a context-aware conversational assistant that can quickly and accurately provide the user with the needed information.

SUMMARY

Embodiments of the invention address the above-described need by providing for hybrid, context-aware conversational assistant for an agent. In particular, in a first embodiment, the invention includes one or more non-transitory computer-storage media storing computer executable instructions that, when executed by a processor, display a user interface for a context-aware conversational assistant comprising a first pane displaying a history of one or more past messages between a user and an agent, wherein the history includes a message from the user including a query, and an input box configured to receive a response message from the agent for transmission to the user, a second pane displaying one or more automatically determined info cards relevant to the query, wherein each of the one or more automatically determined info cards comprises a different pregenerated response to the query, one or more selection controls configured to allow the agent to indicate a selected info card of the one or more automatically determined info cards and thereby prepopulate the input box with the pregenerated response corresponding to the selected info card, an acceptance control configured to allow the agent to accept the message in the input box and thereby transmit it to the user.

In a second embodiment, the invention includes a method of assisting an agent in conducting a conversation with a user, comprising the steps of receiving, from the user, a message including a query, determining a context for the query based on a plurality of historical data items for the user, selecting a plurality of relevant info cards based at least in part on the query and the determined context for the query, presenting, to the agent, the plurality of relevant info cards, receiving, from the agent, an indication of a relevant info card of the plurality of relevant info cards, prepopulating an input box with a response to the query based on the indicated relevant info card, receiving, from the agent an acceptance of the response, and transmitting, to the user, the response.

In a third embodiment, the invention includes one or more non-transitory computer storage media storing computer-executable instructions that, when executed by a processor, perform a method of assisting an agent conduct a conversation with a user, comprising the steps of displaying, in a first pane a history of one or more past messages between the user and the agent including a message from the user including a query and an input box configured to receive a response message from the agent for transmission to the user, displaying, in a second pane a plurality of info cards selected based on relevancy to the query, wherein each info card comprises a different pregenerated response to the query, receiving, from the agent, an indication of an info card of the plurality of info cards, prepopulating the input box with a pregenerated response corresponding to the indicated info card, receiving, from the agent, one or more edits to the pregenerated response to generate an edited response. and transmitting, to the user, the edited response.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the current invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
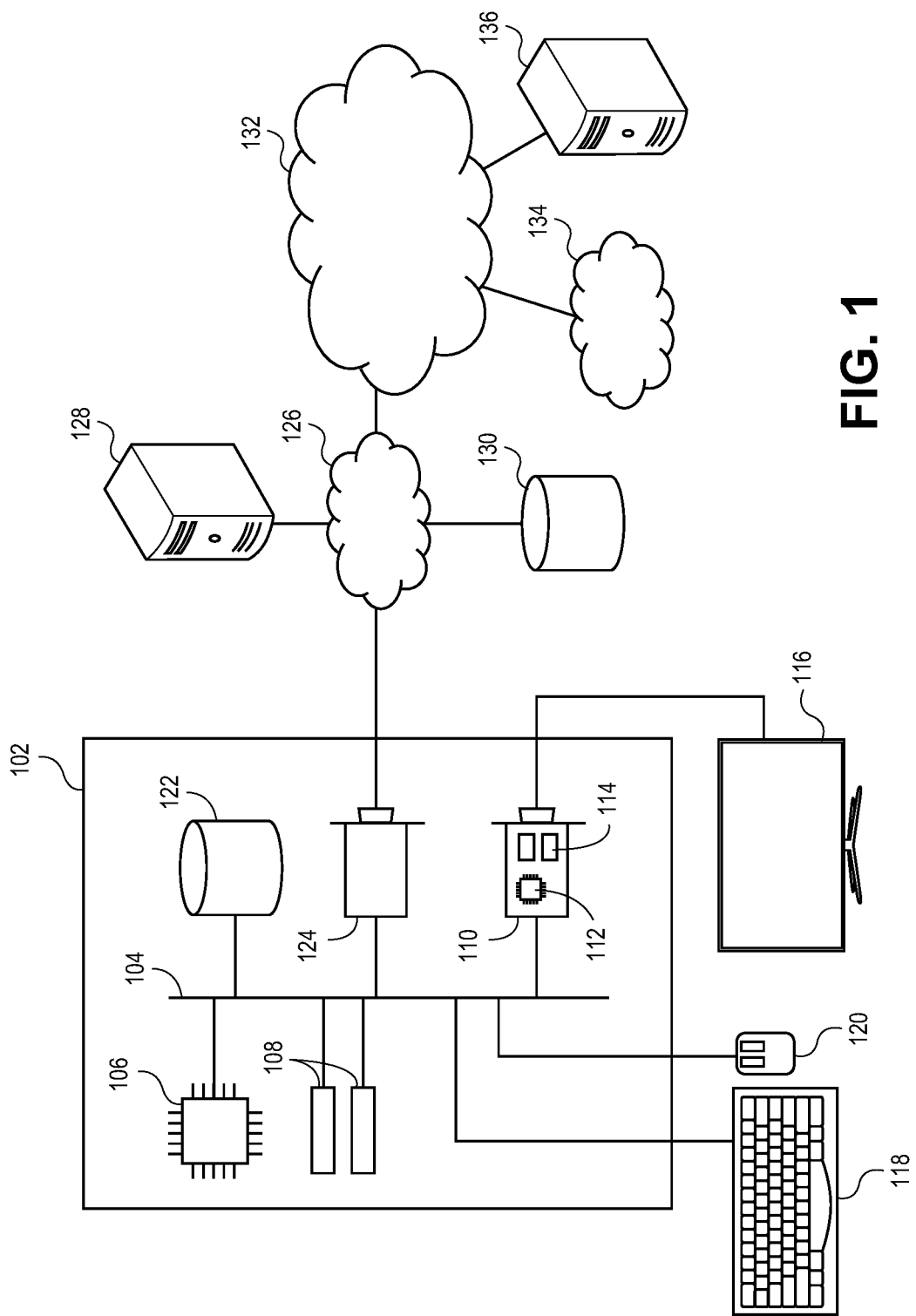
FIG. 1 depicts an exemplary hardware platform for certain embodiments of the invention.

The drawing figures do not limit the invention to the specific embodiments disclosed and described herein. The drawings are not necessarily to scale, emphasis instead being placed upon clearly illustrating the principles of the invention.

DETAILED DESCRIPTION

At a high level, embodiments of the invention provide for a context-aware conversational assistant for an agent chatting with a user. When the user asks a question, the conversational assistant determines one or more questions the user may be asking and, based on all known information about the user and the user's history, the relevant answers to those questions. Each possible question and the corresponding answer are displayed in a separate "info card" for the agent. The agent can review these info cards, and if one of them accurately answers the user's question, automatically generate a response for sending to the user by selecting the corresponding info card. If no info card is directly applicable, the agent can modify a pregenerated answer or compose a responsive answer from scratch.

The subject matter of embodiments of the invention is described in detail below to meet statutory requirements; however, the description itself is not intended to limit the scope of claims. Rather, the claimed subject matter might be embodied in other ways to include different steps or combinations of steps similar to the ones described in this document, in conjunction with other present or future technologies. Minor variations from the description below will be obvious to one skilled in the art, and are intended to be captured within the scope of the claimed invention. Terms should not be interpreted as implying any particular ordering of various steps described unless the order of individual steps is explicitly described.

The following detailed description of embodiments of the invention references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of embodiments of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate reference to "one embodiment" "an embodiment", or "embodiments" in this description do not necessarily refer to the same embodiment and are also not mutually exclusive unless so stated and/or except as will be readily apparent to those skilled in the art from the description. For example, a feature, structure, or act described in one embodiment may also be included in other embodiments, but is not necessarily included. Thus, the technology can include a variety of combinations and/or integrations of the embodiments described herein.

Turning first to FIG. 1, an exemplary hardware platform for certain embodiments of the invention is depicted. Computer 102 can be a desktop computer, a laptop computer, a server computer, a mobile device such as a smartphone or tablet, or any other form factor of general—or special-purpose computing device. Depicted with computer 102 are several components, for illustrative purposes. In some embodiments, certain components may be arranged differently or absent. Additional components may also be present. Included in computer 102 is system bus 104, whereby other components of computer 102 can communicate with each other. In certain embodiments, there may be multiple busses or components may communicate with each other directly. Connected to system bus 104 is central processing unit (CPU) 106. Also attached to system bus 104 are one or more random-access memory (RAM) modules. Also attached to system bus 104 is graphics card 110. In some embodiments, graphics card 110 may not be a physically separate card, but rather may be integrated into the motherboard or the CPU 106. In some embodiments, graphics card 110 has a separate graphics-processing unit (GPU) 112, which can be used for graphics processing or for general purpose computing (GPGPU). Also on graphics card 110 is GPU memory 114. Connected (directly or indirectly) to graphics card 110 is display 116 for user interaction. In some embodiments no display is present, while in others it is integrated into computer 102. Similarly, peripherals such as keyboard 118 and mouse 120 are connected to system bus 104. Like display 116, these peripherals may be integrated into computer 102 or absent. Also connected to system bus 104 is local storage 122, which may be any form of computer-readable media, and may be internally installed in computer 102 or externally and removeably attached.

Computer-readable media include both volatile and non-volatile media, removable and nonremovable media, and contemplate media readable by a database. For example, computer-readable media include (but are not limited to) RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices. These technologies can store data temporarily or permanently. However, unless explicitly specified otherwise, the term "computer-readable media" should not be construed to include physical, but transitory, forms of signal transmission such as radio broadcasts, electrical signals through a wire, or light pulses through a fiber-optic cable. Examples of stored information include computer-usable instructions, data structures, program modules, and other data representations.

Finally, network interface card (NIC) 124 is also attached to system bus 104 and allows computer 102 to communicate over a network such as network 126. NIC 124 can be any form of network interface known in the art, such as Ethernet, ATM, fiber, Bluetooth, or Wi-Fi (i.e., the IEEE 802.11 family of standards). NIC 124 connects computer 102 to local network 126, which may also include one or more other computers, such as computer 128, and network storage, such as data store 130. Generally, a data store such as data store 130 may be any repository from which information can be stored and retrieved as needed. Examples of data stores include relational or object oriented databases, spreadsheets, file systems, flat files, directory services such as LDAP and Active Directory, or email storage systems. A data store may be accessible via a complex API (such as, for example, Structured Query Language), a simple API providing only read, write and seek operations, or any level of complexity in between. Some data stores may additionally provide management functions for data sets stored therein such as backup or versioning. Data stores can be local to a single computer such as computer 128, accessible on a local network such as local network 126, or remotely accessible over Internet 132. Local network 126 is in turn connected to Internet 132, which connects many networks such as local network 126, remote network 134 or directly attached computers such as computer 136. In some embodiments, computer 102 can itself be directly connected to Internet 132.

Figure 2:
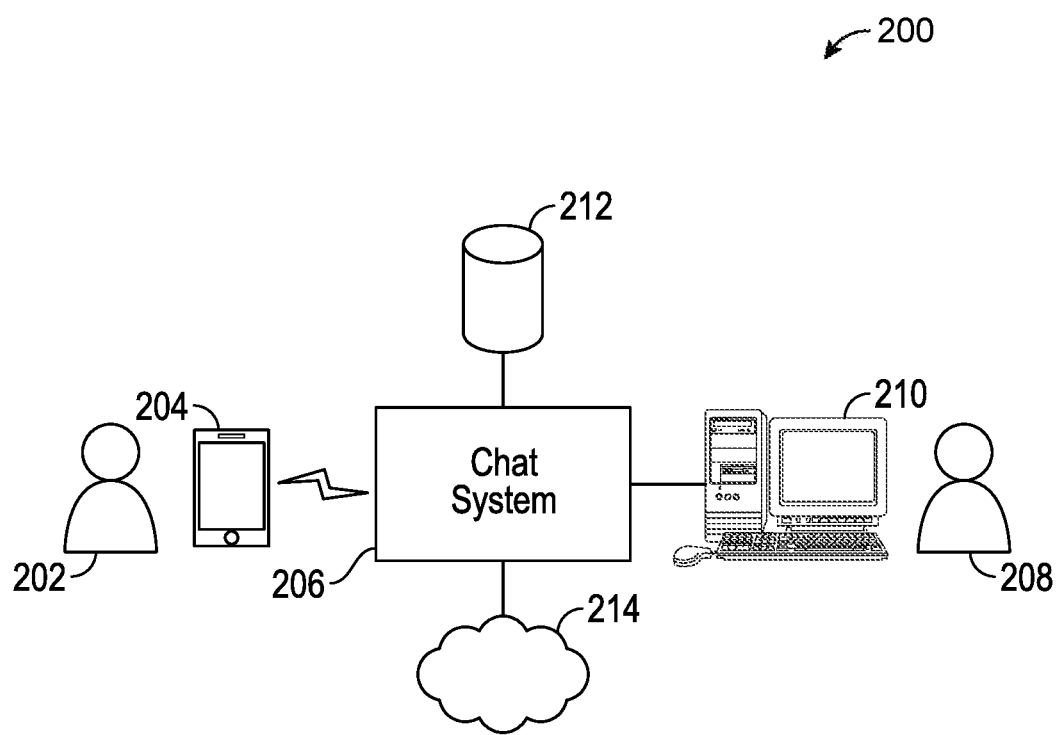
FIG. 2 depicts a block diagram showing the components of a system embodying the invention.

Turning now to FIG. 2, a block diagram showing the components of a system embodying the invention is depicted and referred to generally by reference numeral 200. As depicted, user 202 uses device 204 to connect to chat system 206. For example, user 202 may be a taxpayer completing a tax interview via their smartphone who has requested help answering a particular question from a tax professional. Alternatively, user 202 may be a customer requesting technical support for a computer from the vendor. Broadly speaking, user 202 may be any person interacting with a chat system. As depicted, device 204 is a smartphone of user 202; however, device 204 may be any form of computing device described above with respect to FIG. 1 or any other communications device. For example, the user can connect to chat system 206 using a desktop or laptop computer. In some embodiments, user device 204 incorporates one or more sensors such as a microphone, still or video camera, skin conductivity sensors, fingerprint sensor, heart monitor or other form of sensor. Alternatively, user 202 can call chat system 206 using any form of telephone and speak with an agent interacting with chat system 206. Broadly speaking, any form of communications device is envisioned as being operable with embodiments of the invention.

Chat system 206 facilitates communication between user 202 and agent 208 via respective communication terminals device 204 and device 210. For example, chat system 206 may be a central server that forwards messages from user 202 to agent 208 and vice versa. Alternatively, chat system 206 can be installed locally on device 210 of agent 208. Chat system 210 can intermediate communication between agent 208 and user 202 whatever the format. For example, chat system can intermediate instant message chatting over the Internet, communication via email, communication via SMS, communication via in-app smartphone messaging, or telephonic communication. One of skill in the art will appreciate that there are many communication technologies between user 202 and agent 208, and embodiments of the invention are broadly contemplated as working with any such communications technology. As with user device 204, agent device 210 can broadly be any form of communications device, and can be distinct from or integrated with user device 204. Agent 208 can be a customer service representative, professional, advisor, or any other party with whom user 202 wishes to communicate.

Chat system 206 is communicatively coupled with user history data store 212. Broadly speaking, user history data store 212 collects information about current and previous communications with each user such as user 202 as well as any contextual information that could inform further communication with user 202. For example, in the context of the above example where user 202 is a taxpayer completing a tax interview, user history data store 212 may store past tax returns (and/or the corresponding completed tax interviews) for that user, downloaded (or uploaded) tax forms for the current year, logs of any previous chats with agent 208 or other agents, and so forth.

Chat system 206 may also be communicatively coupled with Internet 214, corresponding to Internet 132, in order to retrieve additional information relevant to the communication with user 202. For example, if user 202 is calling for technical support with software, the details of their hardware configuration may be downloaded from Internet 214 and stored in user history data store 212 to assist agent 208 in providing more concrete and particularized instructions for solving their problem. Similarly, tax form relevant to user 202 (such as wage and bank statements) can be automatically downloaded from payroll providers and/or financial institutions and stored in user history data store 212 so that user 202 need not provide the information manually.

Chat system 206 may further communicate directly with user device 204 (as distinct from user 202) to acquire still more contextually relevant information. For example, information about the location of user 202 can automatically be determined. Thus, for example, if user 202 is a stranded traveler calling a roadside service provider, the system can automatically determine the location of the user (and/or their vehicle) to provide dispatch information. Similarly, if device 204 incorporates one or more biometric sensors, these sensors can provide relevant information about the user. For example, if agent 208 is a medical professional, information such as heart rate can be provided directly by device 204. As another example, fingerprint (or other biometric) information can be used to confirm the identity of user 202 without requiring them to manually provide authentication information. Chat system 206 may also use biometric information (potentially in combination with information provided directly by the user) to perform sentiment analysis and determine a mood for user 202. This mood can then inform subsequent communication as described in greater detail below.

Figure 3:
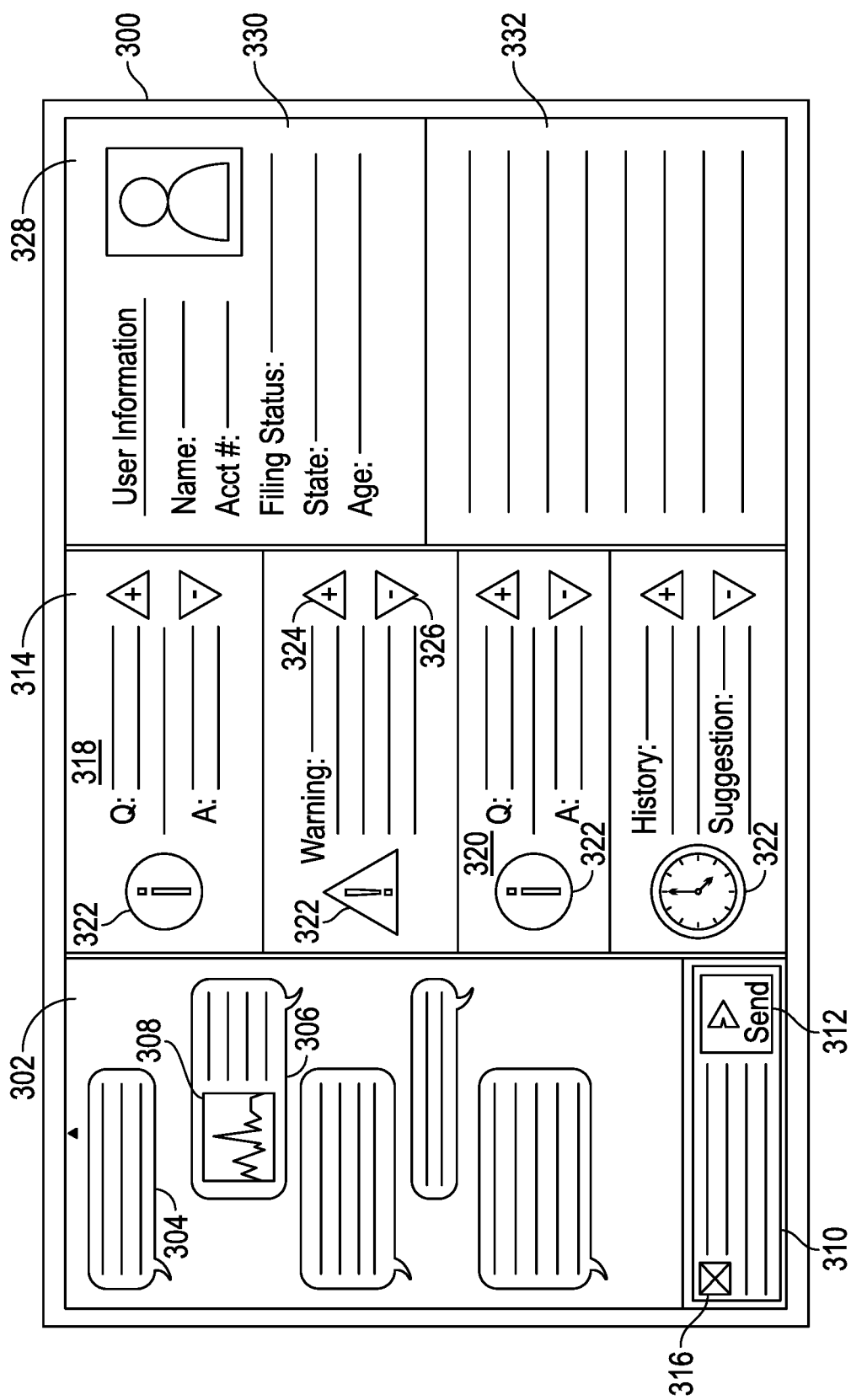
FIG. 3 depicts an exemplary user interface suitable for use with embodiments of the invention.

Turning now to FIG. 3, an exemplary user interface suitable for use with embodiments of the invention is depicted and referred to generally by reference numeral 300. Interface 300 is suitable for display on the agent device 210; however, suitably modified, interface 300 may also be suitable for display on user device 204. As depicted, interface 300 includes chat pane 302. Chat pane 302, in turn, includes a history of messages 304 sent by user 202 and messages 306 sent by agent 208. In some embodiments, messages 304 and 306 are purely textual messages. In other embodiments, however, messages 306 (and/or messages 304) are rich messages that can contain additional types of content such as images, infographics, radio buttons, and so on to better assist user 202. Such rich messages are disclosed in greater detail in co-pending U.S. patent application Ser. No. 15/450,657 filed Mar. 6, 2017 and entitled HYBRID CONVERSATIONAL CHAT BOT SYSTEM, which is hereby incorporated in its entirety by reference. For example, as depicted, message 306 contains additional content 308. In some embodiments, pregenerated messages including additional content 308 are generated by chat system. In other embodiments, agent 208 has access to a library of pregenerated or custom content that they can add to messages prior to sending.

Chat pane 302 further includes a message input box 310 and message send button 312. Agent 208 can type (or otherwise input) a response to a message 304 from user 202. In some embodiments, message input box 310 further includes functionality to attach or otherwise incorporate additional content such as additional content 308. However, in some embodiments, agent 208 can also automatically populate the a response in message input box 310 by selecting a relevant info card from info card pane 314, as discussed below. In other embodiments, chat system 206 may automatically populate message input box 310 for agent 208 based on a determined most likely response to the question posed by user 202. An automatically populated response may answer the posed question or request additional information from user 202 needed to answer the question. In some embodiments, agent 308 can accept the prepopulated (or manually entered) response using message send button 312, or clear the automatically populated response using clear response button 316 if the response is not appropriate.

For example, in the tax interview example given above, the user may ask the question "I got shingles last year. How do I deduct the cost on my taxes?" Chat system 206 will determine the most likely responses to this question based on a knowledge database and information stored in user history data store 212. Possible answers can be populated as info cards in info pane 314. For example, a first info card 318 might have information relevant to deducting costs associated with reshingling a house and a second info card might have information on deducting the medical expenses associated with diseases such as shingles. User history data store 212 might have a mortgage interest statement for user 202, indicating that they own a home. The system might use this information as context for the user's question and autopopulate info card 318 (containing information about deducting the costs of reshingling a house). Given other contextual information (for example, if the user has uploaded medical bills into user history data store 212), chat system might instead populate info card 320 (containing information on deducting the medical expenses associated with diseases) instead. In some embodiments, agent 208 can then either send the message using message send button 312, select a different info card from pane 314 to prepopulate a different response in message input box 310, or clear the prepopulated message using clear message button 316.

As discussed above, chat system 206 can populate info card pane 314 with a variety of info cards that can be used to populate message input box 310. Some info cards can instead contain messages requesting clarification from user 202 where the context for the user's previous question is unclear. In some embodiments, certain info cards are used to provide agent 208 with information rather than to populate message input box 310. For example, certain info cards can contain snippets of previous chat conversations with user 202. Thus, for example, if user 202 asked a very similar question yesterday, it may indicate that they did not understand the answer that was provided by chat system 206, and so additional explanation should be provided. Alternatively, an info card could contain a warning for agent 208 that user sentiment analysis indicates that the user is becoming frustrated and care should be take to avoid angering them. As yet another example, an info card might be present indicating that the user's question indicates a complex situation that should be elevated to a more experienced agent. Broadly speaking, an info card can contain any information that could determine or impact a response by agent 208.

In some embodiments, info cards such as info cards 318 and 320 contain an icon 322 indicating the content of the info card so that agent 208 can quickly identify any warnings or relevant historical information before selecting an info card containing a result. Info cards may contain only the response that will be prepopulated into message input box 310, they may contain a paraphrase of the question together with the response, or (for certain info cards, as described above) they may not contain a response at all. Broadly speaking, info cards can contain data, hyperlinks, and/or formatted textual content. In some embodiments, an info card may contain indicators 324 and/or 326 for allowing agent 208 to rate a particular info card as useful or not useful. In this way, the performance of chat system 206 can be improved over time such that it provides more useful info cards and fewer info cards that are not useful. One of skill in the art will appreciate that a variety of indicators 324 and 326 can be employed, such as a thumbs-up/thumbs-down system, a star rating system, or any other feedback mechanism.

As depicted, interface 300 further includes context pane 328. Context pane 328 serves to provide agent 208 with context information relevant to the user's current question. In some embodiments, this is the information used by chat system 206 to determine relevant info cards for info card pane 314. In other embodiments, more or less information is provided to agent 208 in context pane 328. As depicted, context pane 328 includes static user information 330 and dynamic user information 332. Broadly speaking, the same information is displayed in static user pane 330 throughout the interaction with user 202. For example, the user's name, account number, age, sex, preferred form of address, and so forth may be displayed to provide agent 208 with the basic information needed to formulate an appropriate response to user 202. Such information includes historic data items for the user not based on the current query posed by the user.

Dynamic user pane 332, by contrast, presents information determined to be relevant to the current question posed by user 202. For example, in the example described above where user 202 asks a question about shingles, historical information relevant to that question, such as home ownership information, whether the user has medical bills, and whether the user would currently benefit from itemizing their deductions, can be displayed in dynamic pane 332. In some embodiments, information displayed in dynamic pane 332 can be displayed in summary or otherwise abbreviated form. In some such embodiments, agent 208 can click in the dynamic user pane to access more detailed information for any item of dynamic user data displayed. In some embodiments, only the most relevant information (such as those historical data items used to populate info card pane 314 with info cards) is displayed in dynamic user 332. In other embodiments, all potentially relevant historical data items are displayed. In yet other embodiments, a fixed number of relevant historical data items are displayed.

Figure 4:
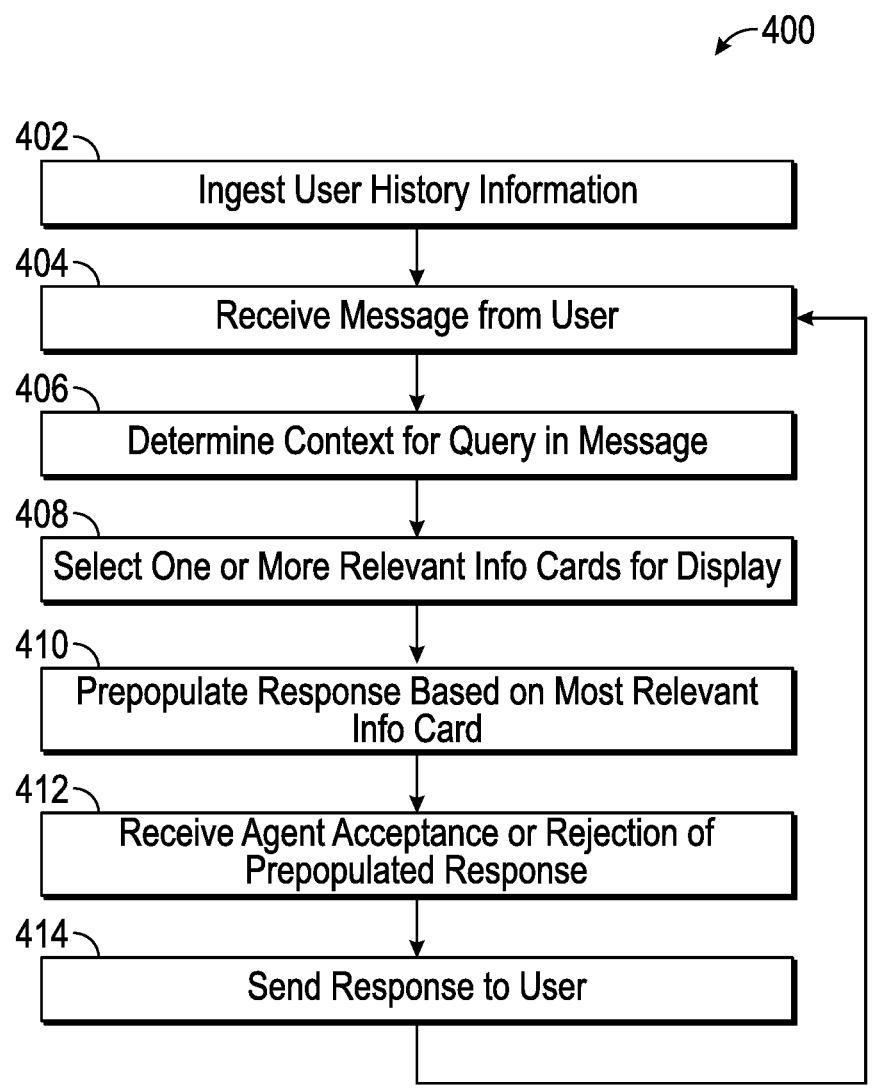
FIG. 4 depicts a flowchart illustrating the operation of a method in accordance with embodiments of the invention.

Turning now to FIG. 4, a flowchart illustrating the operation of a method in accordance with embodiments of the invention is depicted and referred to generally by reference numeral 400. Initially at a step 402, user history information is ingested from user history data store 212. In some embodiments, data from previous chat interactions with user 202 is ingested. In other embodiments, additional data (such as prior-year tax returns, user purchase history, or user account information) is additionally ingested. In still other embodiments, user history information is retrieved form the Internet. For example, tax documents from payroll providers or financial institutions could be ingested. As another example, relevant information from one or more social media accounts for user 202 may be ingested. As a part of this process ingested data may be preprocessed to identify and extract relevant excerpts or data items. In some embodiments, these relevant data items are associated with the original source such that an agent such as agent 208 can view the original context of a data item if it becomes relevant. User history information retrieved from the Internet in this way may be stored (alone or with the original context) in user history data store 212 for later reuse.

Next, at step 404, a user message containing a query or request is received from user 202. In some embodiments, user messages that do not contain queries or requests (for example, requests that contain pleasantries or answers to questions asked by agent 208) may also be received by the system. One of skill in the art will appreciate that much of the processing described below can be skipped for some such messages. Alternatively, the system can generate appropriate responses to non-query messages (for example, responsive pleasantries or acknowledgments of information provided by user 202) in the same ways described herein for providing answers to messages containing queries. As described above, chat system 206 may be a separate system or integrated into the device of agent 208. As such, this request may be received at chat system 206 or directed at the device of agent 208. In the former case, the user question or comment may be forwarded to the device of agent 208. In either case, the user message is displayed on the display of agent device 210 and recorded in user history data store 212 for subsequent analysis.

Processing can then proceed to step 406, where the context for a query or request contained in the user message is determined. Broadly speaking, the context for a query is any information usable to determine a more relevant and/or more accurate response. A first source of context information is the contents of the current chat conversation, weighted by recency. For example, if the user's three immediately previous queries all related to medical expenses, then it is much more likely that the current query relates to medical expenses. A second source of context for the query is the personal and demographic information about user 202. For example, a 65-year-old user is more likely to be asking about withdrawals from retirement accounts, while a 30-year-old user is more likely to be asking about contributions to retirement accounts.

Another source of context for the user's query relates instead to agent 208 and the level of assistance likely to be needed. For example, if the user asks a question in an area where the agent has a high level of expertise, then the system may provide less guidance then if the user's query relates to an area where the agent has limited or no expertise. Yet another source of context for the user's query is previous interactions with the user. For example, if the user has asked questions related to a particular topic in the past, then the current query is more likely to be related to that topic or a similar topic. For example, if the user has asked questions in prior years related to the deductibility of various home improvements, then the query given above about shingles is more likely to be related to reshingling a house than the disease.

Broadly, any information from user history data store 212, user device 204 or Internet 214 can serve as a source of context for the user's query. For example, sentiment analysis of recent messages in the current chat can be combined with biometric information from user device 204 and recent social media postings to determine that the user is becoming frustrated. As described in greater detail below, this context can affect the interaction with the user by changing the tone and/or level of detail included in responses, or by causing the user to be escalated to a higher level of customer support.

Next, at step 408, the context is used to select (or generate) one or more relevant info cards related to the user's query. Broadly speaking, the info cards selected for a query may be related to one or more potential interpretations for a query. Continuing the example from above, one info card may be selected related to reshingling a house, while another info card may be selected related to the disease. In some embodiments, multiple info cards may be selected for a single interpretation of a query. For example, one info card may be selected related to shingling a taxpayer's primary residence, a second may be selected related to reshingling a rental property, and a third may be selected related to reshingling a commercial building. As described above, info cards may include a paraphrase of the question being answered in addition to the answer so as to allow agent 208 to select the info card most closely corresponding to the user's query. Info cards may also be selected that do not respond to the user's query directly, but address peripheral issues. For example, if a user asks a question about the deductibility of state income taxes but has not yet prepared a state income tax return, an info card relating to a state tax return preparation product may be selected as well. As discussed above, info cards relating to similar questions asked by the user previously may also be selected. Selected info cards may be displayed in info card panel 314 for review and/or selection by agent 208.

Processing can then proceed to step 410, where (in some embodiments) a most relevant info card is used to prepopulate a response to the user's query. For example, if the user's query relates to shingles, then at step 408 (as described above) info cards may be selected related to reshingling a taxpayer's house, the disease, reshingling a rental property, and reshingling a commercial building. Based on the context determined at step 406, chat system 206 may determine that the most relevant info card relates to tax deductions for reshingling a taxpayer's home. Such an info card might read "Q: Can I deduct the costs of repairs and improvements (such as reshingling) to my primary residence? A: The costs of home improvements and repairs to your primary residence are generally not deductible. However, you should still save these receipts, as they can be used to offset taxes incurred when you sell your house." This info card thus has three parts: a restatement of the question, the direct answer, and additional information. The response populated might include only the direct answer, or the direct answer and the additional information. In some embodiments, the response populated from the info card is modified based on the level of expertise of user 202 and/or user sentiment analysis. Thus, for example, the complete response might be populated for a sophisticated user, while only the direct answer might be populated for a less sophisticated user or for a user who is becoming impatient.

Next, at step 412, agent 208 accepts or rejects the prepopulated response. For example, agent 208 might accept the prepopulated response by selecting the "send message" button 312, or reject the message using the "clear message" button 316. In some embodiments, agent 208 may edit the prepopulated response in message entry box 310 prior to sending it. In some embodiments, the user can also reject the message by clicking on a different info card to use to prepopulate a different response in message entry box 310. In still other embodiments, no message is automatically prepopulated; rather, agent 208 selects an info card such as info card 310 from info card pane 314, and chat system 206 prepopulates the response based on the selected info card. In some embodiment, the system may automatically prepopulate message input box 310 with the response if a confidence score for the info card is sufficiently high. In some embodiments, the system may also update a relevancy rating for one or more selected info cards at this step. For example, if the agent chooses a different info card from the one determined to be most relevant for the response, the system may reduce the relevancy rating of the rejected info card and/or increase the relevancy rating for the selected alternative. In some embodiments, agent 208 can manually adjust the relevancy rating for displayed info cards using buttons 324 and 326. In this way, less relevant info cards can be shown less frequently and more relevant info cards can be populated in info card pane 314 instead. In some embodiments, step 412 may be skipped for certain responses. For example, the systems determines that user 202 should be escalated to the next level of support, a message may be prepopulated and immediately send without waiting for agent 208 to accept or reject it.

Finally, at a step 414, the response (prepopulated, edited, or manually entered by agent 208) is transmitted to user device 204 for display to user and processing can return to step 404 for the next user query. In some embodiments, if the user asks follow-up questions or otherwise indicates that the answer received was not relevant or was incomplete, the relevancy rating for the associated info card can be further adjusted on that basis.

Many different arrangements of the various components depicted, as well as components not shown, are possible without departing from the scope of the claims below. Embodiments of the invention have been described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims. Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. One or more non-transitory computer-storage media storing computer executable instructions that, when executed by at least one processor, perform a method of providing a context-aware conversational assistant, the method comprising:
   presenting, by a first user interface on a user computing device, messages between a user and a human agent and an inbox configured to receive a message from the user;
   requesting a biometric scan to be obtained by a sensor associated with the user computing device;
   obtaining biometric data from the user by the sensor associated with the user computing device and authenticating an identity of the user by comparing the biometric data to stored identity data associated with a user history data store;
   obtaining historic data associated with the user history data store comprising a past query and a past response to the past query;
   receiving, by the inbox on the first user interface, the message from the user, the message comprising a query;
   analyzing the query to determine a query meaning, wherein the query meaning has a first interpretation and a second interpretation;
   analyzing the past query and determining a higher likelihood that the query meaning is indicative of the first interpretation based on the past response to the past query,
   wherein the past response to the past query is indicative of the first interpretation;
   obtaining sentiment data from the sensor associated with the user computing device;
   analyzing the sentiment data and the historic data associated with the user to determine a mood of the user based on the sentiment data and comparing the message to the past query;
   selecting a set of info cards from a plurality of info cards based on the query, the past response, and the mood of the user,
   wherein the set of info cards include a recommended response to the query based on the first interpretation;
   presenting, by a second user interface and by an agent computing device, the messages between the user and the human agent, and the set of info cards;
   receiving an info card selection by the human agent; and
   presenting a query response by the first user interface to the user based on the info card selection by the human agent.

2. The media of claim 1,
   wherein the sentiment data is a first set of sentiment data,
   wherein the method further comprises:
      accessing an application on the user computing device;
      obtaining a second set of sentiment data from the application; and
      updating the set of info cards based at least in part on the second set of sentiment data.

3. The media of claim 2, wherein the application is a social media application, and the second set of sentiment data is obtained from a post of the user on the social media application.

4. The media of claim 1,
   wherein the human agent is a tax agent,
   wherein the query is indicative of tax data on a tax form.

5. The media of claim 4, wherein the method further comprises:
   obtaining salary information associated with the user from a payroll administrator;
   automatically filling a field of the tax form with the salary information; and
   modifying the set of info cards based on the salary information.

6. The media of claim 5, wherein the method further comprises:
   determining a location of the user computing device; and
   modifying the set of info cards based on the location.

7. The media of claim 6,
   wherein the location of the user computing device is a state in the United States,
   wherein the tax form is a state tax form associated with the state.

8. The media of claim 1, wherein selecting the set of info cards from the plurality of info cards is further based on an expertise level of the human agent.

9. A system providing a context-aware conversational assistant, the system comprising:
   at least one processor;
   at least one data store; and
   one or more non-transitory computer-storage media storing computer executable instructions that, when executed by the at least one processor, perform a method of providing the context-aware conversational assistant, the method comprising:
      presenting, by a first user interface on a user computing device, messages between a user and a human agent and an inbox configured to receive a message from the user;
      requesting a biometric scan to be obtained by a sensor associated with the user computing device;
      obtaining biometric data from the user by the sensor associated with the user computing device and authenticating an identity of the user by comparing the biometric data to stored identity data associated with a user history data store;
      obtaining historic data associated with the user the user history data store comprising a past query and a past response to the past query;

receiving, by the inbox on the first user interface, the message from the user, the message comprising a query;
analyzing the query to determine a query meaning, wherein the query meaning has a first interpretation and a second interpretation;
analyzing the past query and determining a higher likelihood that the query meaning is indicative of the first interpretation based on the past response to the past query,
wherein the past response to the past query is indicative of the first interpretation;
obtaining sentiment data from the sensor associated with the user computing device;
analyzing the sentiment data and the historic data associated with the user to determine a mood of the user based on the sentiment data and comparing the message to the past query;
selecting a set of info cards from a plurality of info cards based on the query, the past response, and the mood of the user,
wherein the set of info cards include a recommended response to the query based on the first interpretation;
presenting, by a second user interface and by an agent computing device, the messages between the user and the human agent, and the set of info cards;
receiving an info card selection by the human agent; and
presenting a query response by the first user interface to the user based on the info card selection by the human agent.

10. The system of claim 9,
wherein the sentiment data is a first set of sentiment data, wherein the method further comprises:
accessing an application on the user computing device;
obtaining a second set of sentiment data from the application; and
updating the set of info cards based at least in part on the second set of sentiment data.

11. The system of claim 10, wherein the application is a social media application, and the second set of sentiment data is obtained from a post of the user on the social media application.

12. The system of claim 9,
wherein the human agent is a tax agent,
wherein the query is indicative of tax data on a tax form.

13. The system of claim 12, wherein the method further comprises:
obtaining salary information associated with the user from a payroll administrator;
automatically filling a field of the tax form with the salary information; and
modifying the set of info cards based on the salary information.

14. The system of claim 13, wherein the method further comprises:
determining a location of the user computing device; and
modifying the set of info cards based on the location.

15. The system of claim 14,
wherein the location of the user computing device is a state in the United States,
wherein the tax form is a state tax form associated with the state.

16. The system of claim 9, wherein selecting the set of info cards from the plurality of info cards is further based on an expertise level of the human agent.

17. A method of providing a context-aware conversational assistant, the method comprising:
presenting, by a first user interface on a user computing device, messages between a user and a human agent and an inbox configured to receive a message from the user;
requesting a biometric scan to be obtained by a sensor associated with the user computing device;
obtaining biometric data from the user by the sensor associated with the user computing device and authenticating an identity of the user by comparing the biometric data to stored identity data associated with a user history data store;
obtaining historic data associated with the user history data store comprising a past query and a past response to the past query;
receiving, by the inbox on the first user interface, the message from the user, the message comprising a query;
analyzing the query to determine a query meaning, wherein the query meaning has a first interpretation and a second interpretation;
analyzing the past query and determining a higher likelihood that the query meaning is indicative of the first interpretation based on the past response to the past query,
wherein the past response to the past query is indicative of the first interpretation;
determining that the query is similar to the past query based on the query meaning;
obtaining sentiment data from the sensor associated with the user computing device;
analyzing the sentiment data and the historic data associated with the user to determine a mood of the user based on the sentiment data and comparing the message to the past query;
selecting a set of info cards from a plurality of info cards based on the query, the past response, and the mood of the user,
wherein the set of info cards include a recommended response to the query based on the first interpretation;
presenting, by a second user interface and by an agent computing device, the messages between the user and the human agent, and the set of info cards;
receiving an info card selection by the human agent; and
presenting a query response by the first user interface to the user based on the info card selection by the human agent.

18. The method of claim 17,
wherein the sentiment data is a first set of sentiment data, wherein the method further comprises:
accessing an application on the user computing device;
obtaining a second set of sentiment data from the application; and
updating the set of info cards based at least in part on the second set of sentiment data.

19. The method of claim 18,
wherein the human agent is a tax agent, and
wherein the query is indicative of tax data on a tax form, wherein the method further comprises:
obtaining salary information associated with the user from a payroll administrator;
automatically filling a field of the tax form with the salary information; and
modifying the set of info cards based on the salary information.

20. The method of claim 17, wherein selecting the set of info cards from the plurality of info cards is further based on an expertise level of the human agent.

* * * * *